United States Patent
Cederlof

(10) Patent No.: US 9,294,746 B1
(45) Date of Patent: Mar. 22, 2016

(54) ROTATION OF A MICRO-MIRROR DEVICE IN A PROJECTION AND CAMERA SYSTEM

(75) Inventor: Colter E. Cederlof, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 481 days.

(21) Appl. No.: 13/544,706

(22) Filed: Jul. 9, 2012

(51) Int. Cl.
 *H04N 9/31* (2006.01)

(52) U.S. Cl.
 CPC .......... *H04N 9/3102* (2013.01); *H04N 9/3108* (2013.01); *H04N 9/3111* (2013.01); *H04N 9/3114* (2013.01); *H04N 9/3117* (2013.01); *H04N 9/3123* (2013.01); *H04N 9/3126* (2013.01)

(58) Field of Classification Search
 CPC ...... G03B 21/14; G03B 21/28; G03B 21/005; G03B 21/006; G03B 21/008; H04N 9/3102; H04N 9/3105; H04N 9/3108; H04N 9/3111; H04N 9/3114; H04N 9/3117; H04N 9/312; H04N 9/3123; H04N 9/3126
 USPC ................................. 353/28, 30, 79
 See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,824,039 B2* | 11/2010 | Takito et al. | 353/69 |
| 7,993,011 B2* | 8/2011 | Ikeda et al. | 353/69 |
| 8,641,201 B2* | 2/2014 | Ko et al. | 353/57 |
| 2006/0187421 A1* | 8/2006 | Hattori et al. | 353/69 |
| 2008/0111976 A1* | 5/2008 | Takito et al. | 353/121 |
| 2008/0266528 A1* | 10/2008 | Ikeda et al. | 353/69 |
| 2011/0188008 A1* | 8/2011 | Maeda et al. | 353/85 |
| 2011/0288964 A1 | 11/2011 | Linder et al. | |
| 2012/0140187 A1* | 6/2012 | Ko et al. | 353/57 |
| 2012/0176587 A1* | 7/2012 | Waltermann et al. | 353/70 |
| 2012/0223885 A1 | 9/2012 | Perez | |

FOREIGN PATENT DOCUMENTS

WO   WO2011088053   7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Bao-Luan Le
(74) *Attorney, Agent, or Firm* — Lee & Hayes, PLLC

(57) ABSTRACT

A device includes a projector to project an image onto a surface. The projector includes a micro-mirror device comprising an array of micro-mirrors. Light from a light source is reflected by one or more of the array of micro-mirrors, to project the image onto the surface. In one implementation, the micro-mirror device is rotated to correspondingly rotate the projected image on the surface. In one implementation, the device is housed in a table lamp.

21 Claims, 12 Drawing Sheets

ROTATION OF A MICRO-MIRROR DEVICE IN A PROJECTION AND CAMERA SYSTEM

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented as a table lamp. However, the various implementations of the architecture described herein are merely representative.

Also described herein is an arrangement to rotate an image projected by the projection and camera system. For instance, the projection and camera system may include a projector, which may include a micro-mirror device. The micro-mirror device may include an array of pixel-sized micro-mirrors. Individual micro-mirrors of the micro-mirror device are appropriately oriented to project an image onto a scene. In one implementation, the micro-mirror device may be rotated, such that the projected image is correspondingly rotated.

Illustrative Environment

Figure 1:
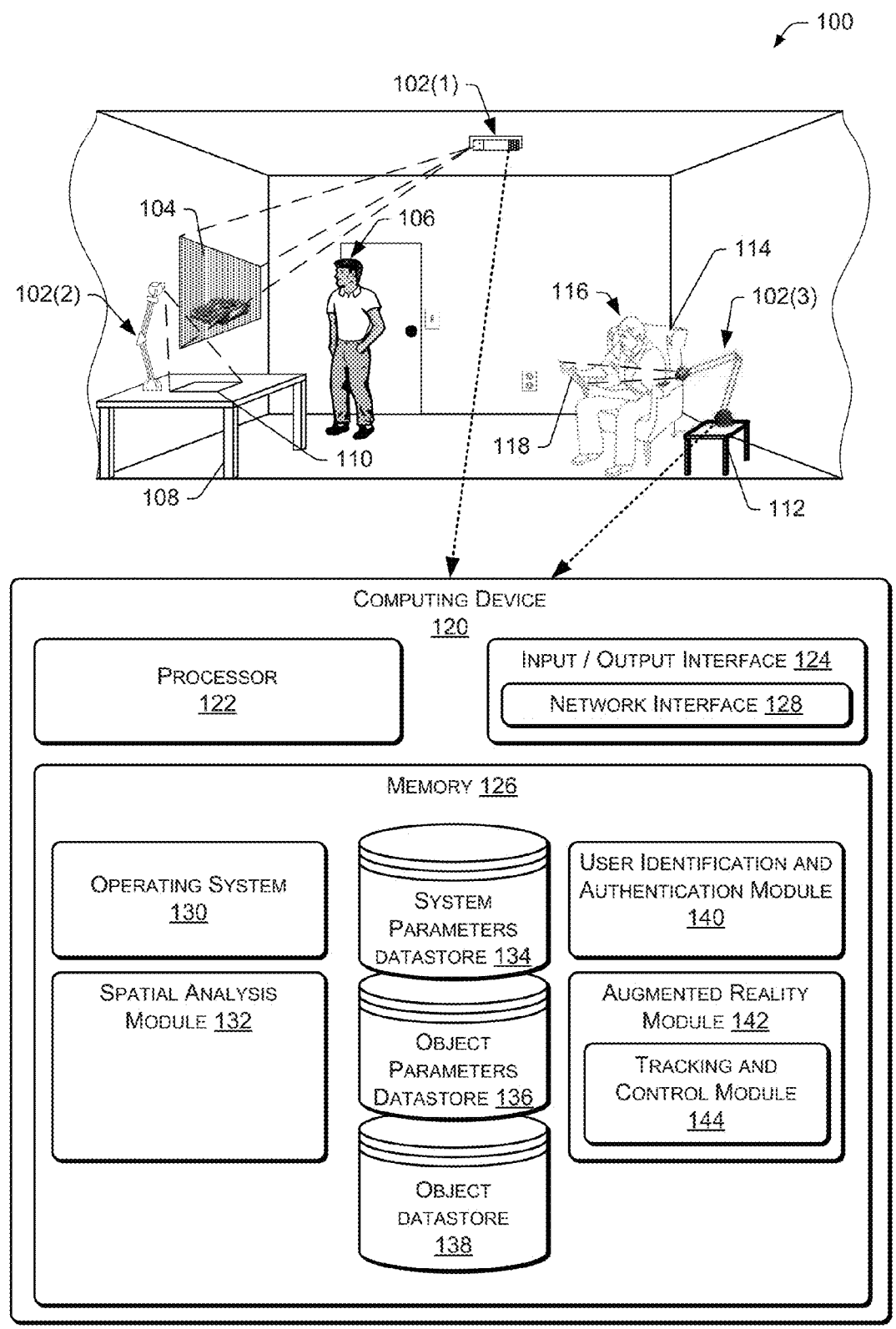
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

First ARFN Implementation—Separate Optics Paths

Figure 2:
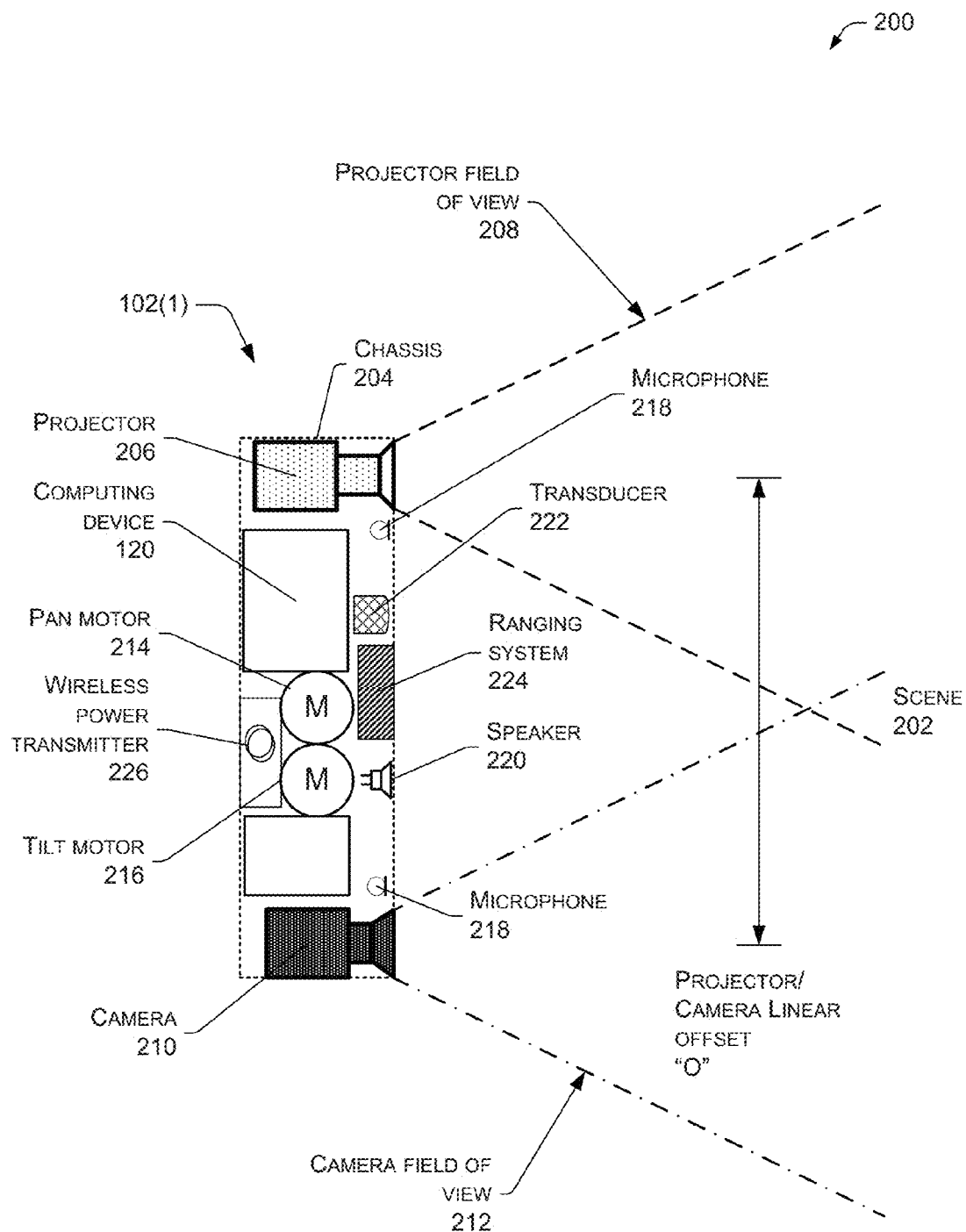
FIG. 2 shows a first implementation of a projection and image capturing system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera (s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
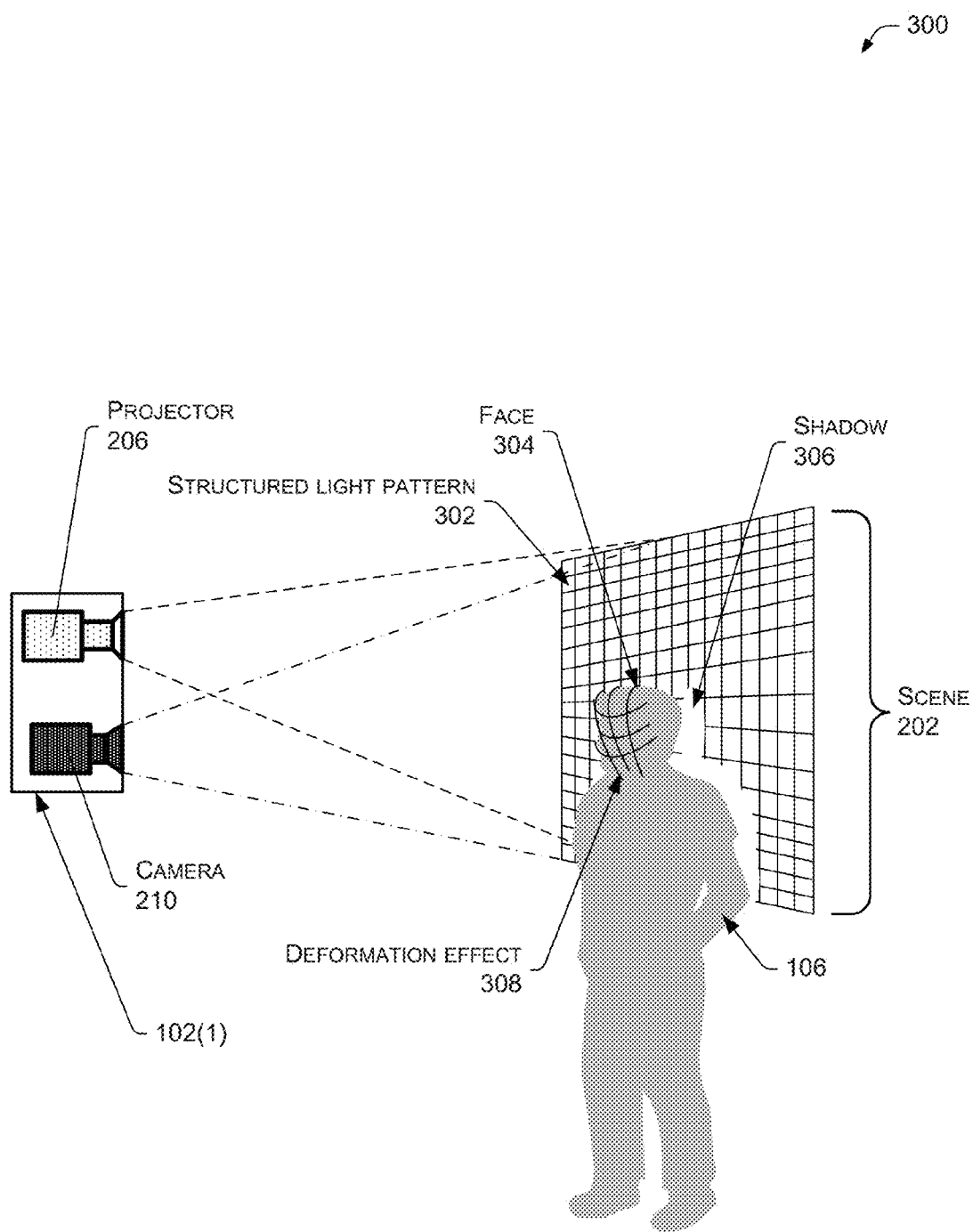
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Second ARFN Implementation—Common Optics Path

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

Figure 4:
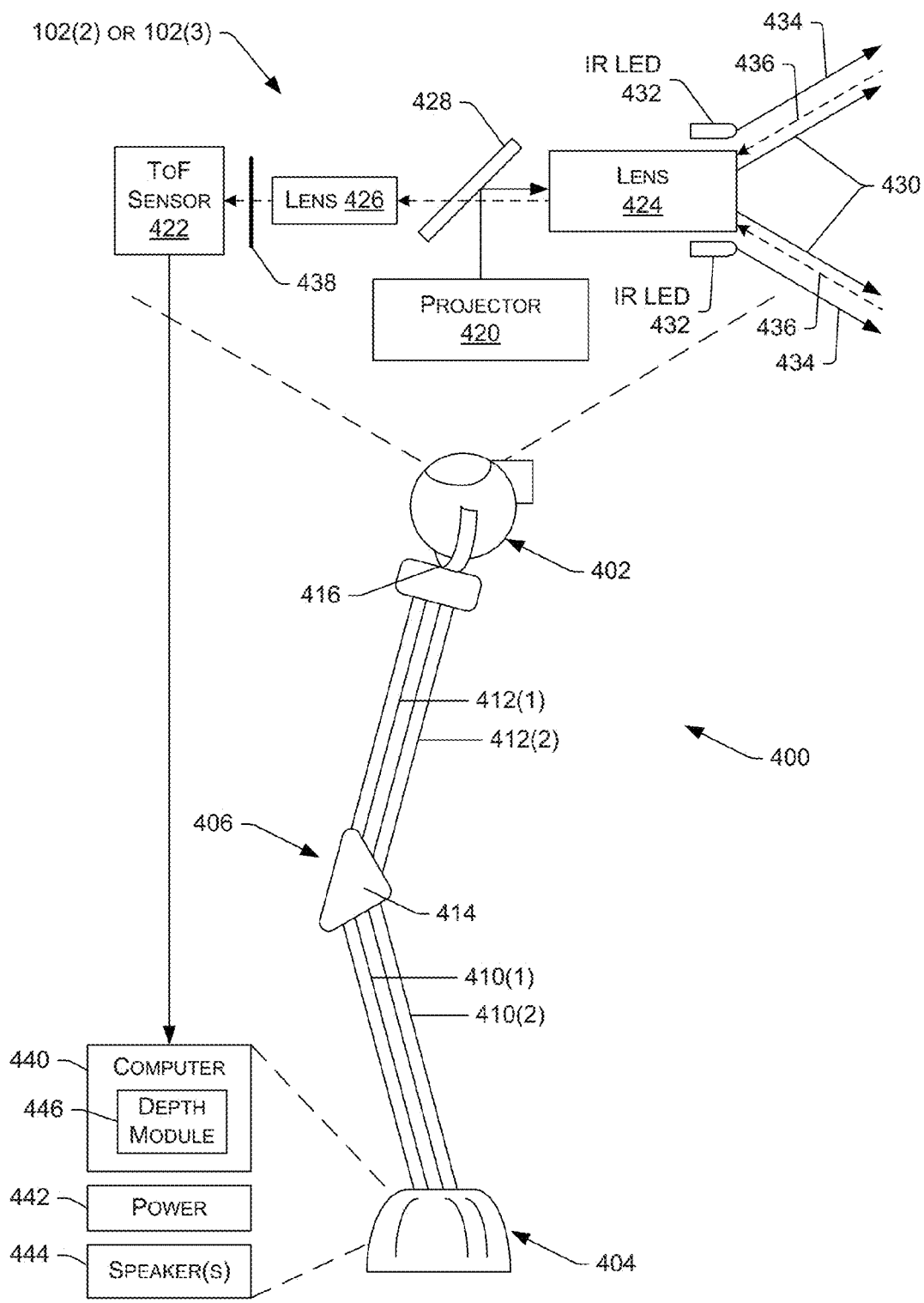
FIG. 4 shows a second implementation of a projection and image capturing system formed as a familiar type of furniture, such as a table lamp. In this implementation, the projector and camera share a common optical path through a common lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom. In still another implementation, a pan may be coupled to the base 404 to enable rotation of the arm mechanism 406 and the head 404.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 326. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102(1).

It is noted that, in other implementations, the projector 420 may be arranged to project an image that is passed through the beam splitter 428 and out through the lens 424, rather than being reflected by the beam splitter 428. In this arrangement, the returning IR signals maybe received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442 and one or more speakers 444. The computer may include processing and memory to execute instructions. A depth module 446 may be executed by the computer 440 to measure a time of flight for an IR signal (or other modulated light output). The time-of-flight value may be derived as a function of a time lapsed between emission from an IR LED 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Figure 5:
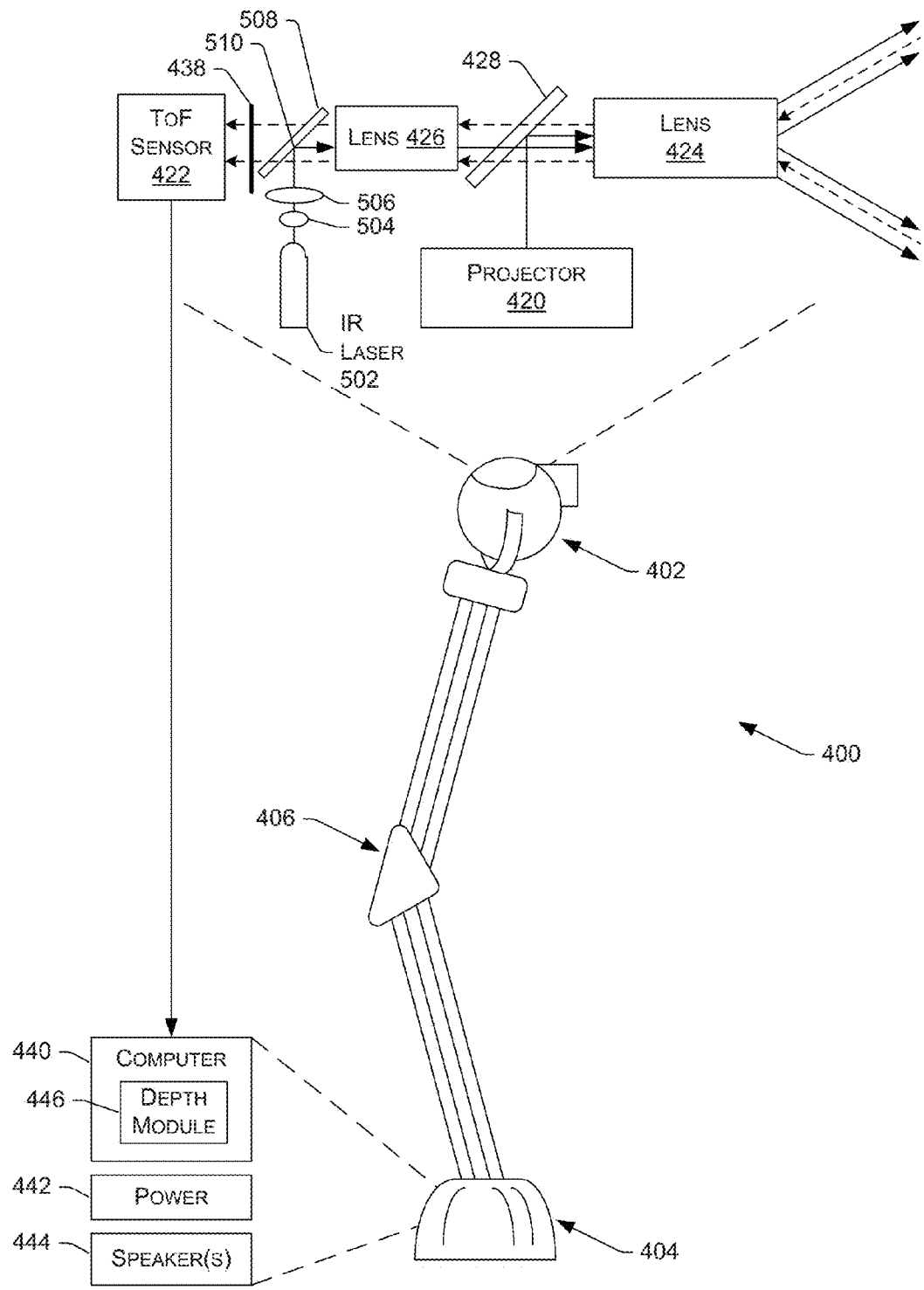
FIG. 5 shows a third implementation of a projection and image capturing system, which is formed as a table lamp similar to the embodiment of FIG. 4. In this implementation, the projector and camera share a common optical path through a common lens, and illumination components also share the same optical path.

FIG. 5 shows another implementation of the ARFN 102(2) or 102(3), also shown implemented as part of a table lamp 400. This implementation differs from that of FIG. 4 in that the illumination system also shares the same optical path as the projector 420 and the ToF sensor 422.

In FIG. 5, an IR laser 502 is used in place of the IR LEDs 432 of FIG. 4. The IR laser 502 outputs an IR beam that is expanded by a beam expander 504 and then concentrated by a focus lens 506 onto an angled beam splitter 508. In one implementation, the angled beam splitter 508 is formed of a material that passes light (e.g., glass) and has a reflective patch 510 at its center. The focus lens 506 concentrates the IR beam onto the reflective patch 510 of the beam splitter 508, which directs the beam through lens 426, through the beam splitter 428, and out through the lens 424. The reflective patch covers the center portion of the beam splitter 508 and may have any number of shapes, such as circular, oval, polygonal, and so forth. With this arrangement, the size and area of interest can be controllably illuminated by use of the lens 424 and modulated IR laser light. The illuminated area is roughly the same size, or slightly larger, than the area onto which images are projected, as is shown in more detail with reference to FIG. 6.

IR signals scattered from a populated landscape are then collected by the head 402 and passed back through the lens 424, through the beam splitter 428, through lens 426, through the non-reflective portion of the angled reflector 508, through the filter 438, and to the ToF sensor 422. Accordingly, the collected scattered IR light forms an image on the ToF sensor 422 that is used to compute time of flight values for depth analysis of the landscape of the scene.

One of the advantages of placing the IR laser 502 as shown and passing the IR beam through the lens system is that the power used for illumination may be reduced as compared to the implementation of FIG. 4, where the IR LEDs are external to the optical path. Illumination typically degrades inversely proportional to the square of the distance. In FIG. 4, the forward and return paths result in an illumination inversely proportional to the distance to the power of four. Conversely, illumination through the same lens means that the returned light is inversely proportional to square of the distance, and therefore can use less stronger illumination to achieve the same results.

It is further noted that essentially any IR device may be used in these systems. Although IR LEDs and IR lasers are shown in the implementations of FIGS. 4 and 5, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 6:
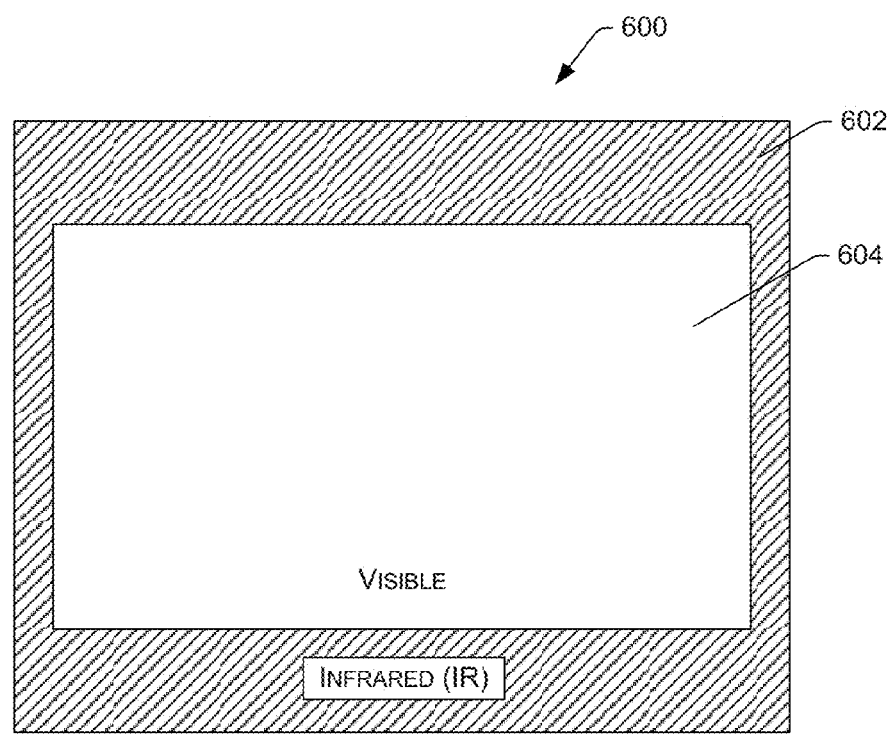
FIG. 6 shows a first area of illumination and a second area of image capture that may be realized by the implementations of FIGS. 4 and 5.

FIG. 6 shows a coverage pattern 600 provided by the ARFN 102(2) or 102(3). The coverage pattern 600 has an illumination area 602 covered by the IR-based illumination system. The coverage pattern 600 also has a projection area 604 covered by the projected image. As shown in this footprint, the illumination area 602 is larger than, and encompasses, the projection area 604. However, in other implementations, the illumination area 602 may be equal to or smaller than, and be encompassed by, the projection area 604. The second lens 426 in the device allows for adjustment in the relative coverage to enable overscan or underscan conditions.

Figure 7:
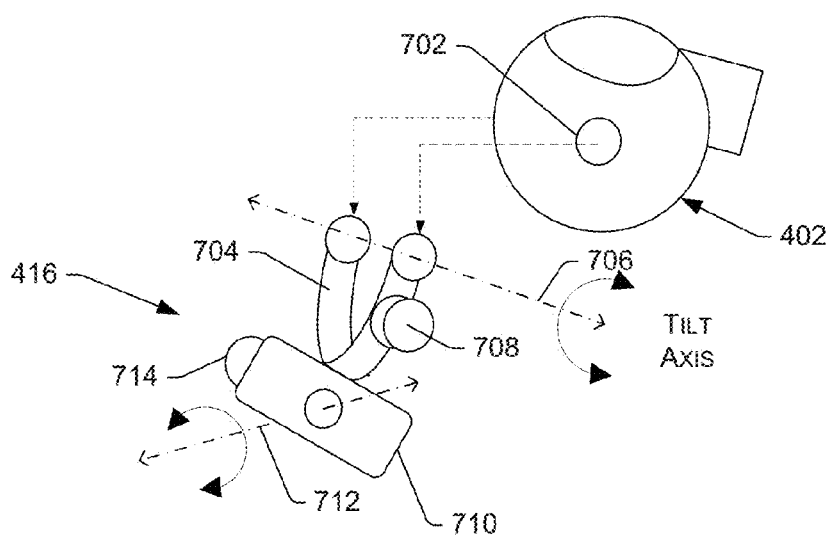
FIG. 7 shows an exploded view of a head and universal mount of the lamp implementation shown in FIGS. 4 and 5.

FIG. 7 shows an exploded view 700 of the head 402 and the universal mount 416 of the lamp implementation shown in FIGS. 4 and 5. Here, the head 402 is generally spherical, although it may be made of any shape, size or form factor. The head 402 has two mounting members 702 on opposing sides of the sphere. The mounting members 702 may be pivotally mounted within a U-shaped cradle 704 to facilitate rotation about a tilt axis 706. A tilt motor 708 may be included to move the head 402 about the tilt axis 706.

The U-shaped cradle 704 is movably mounted relative to structural bracket 710. The U-shaped cradle 704 may be pivoted about a pan axis 712. A pan motor 714 may be included to pivot the U-shaped cradle 704 and head 402 about the pan axis 712.

Exemplary Micro-Mirror Device Arrangements in the Lamp Head

Figure 8A:
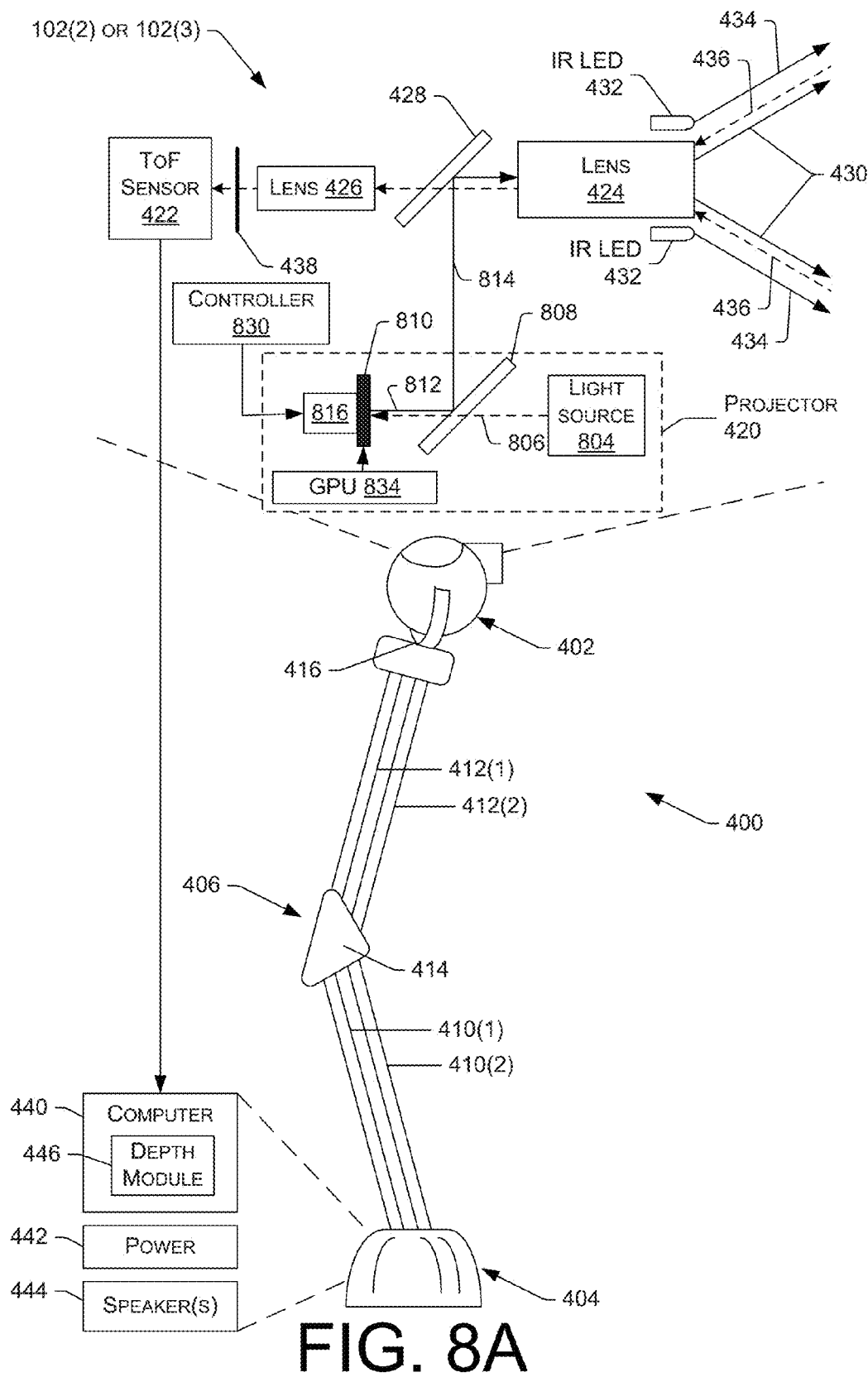
FIG. 8A shows another implementation of a projection and image capturing system formed to appear as a familiar type of furniture, such as a table lamp.
Figure 8B:
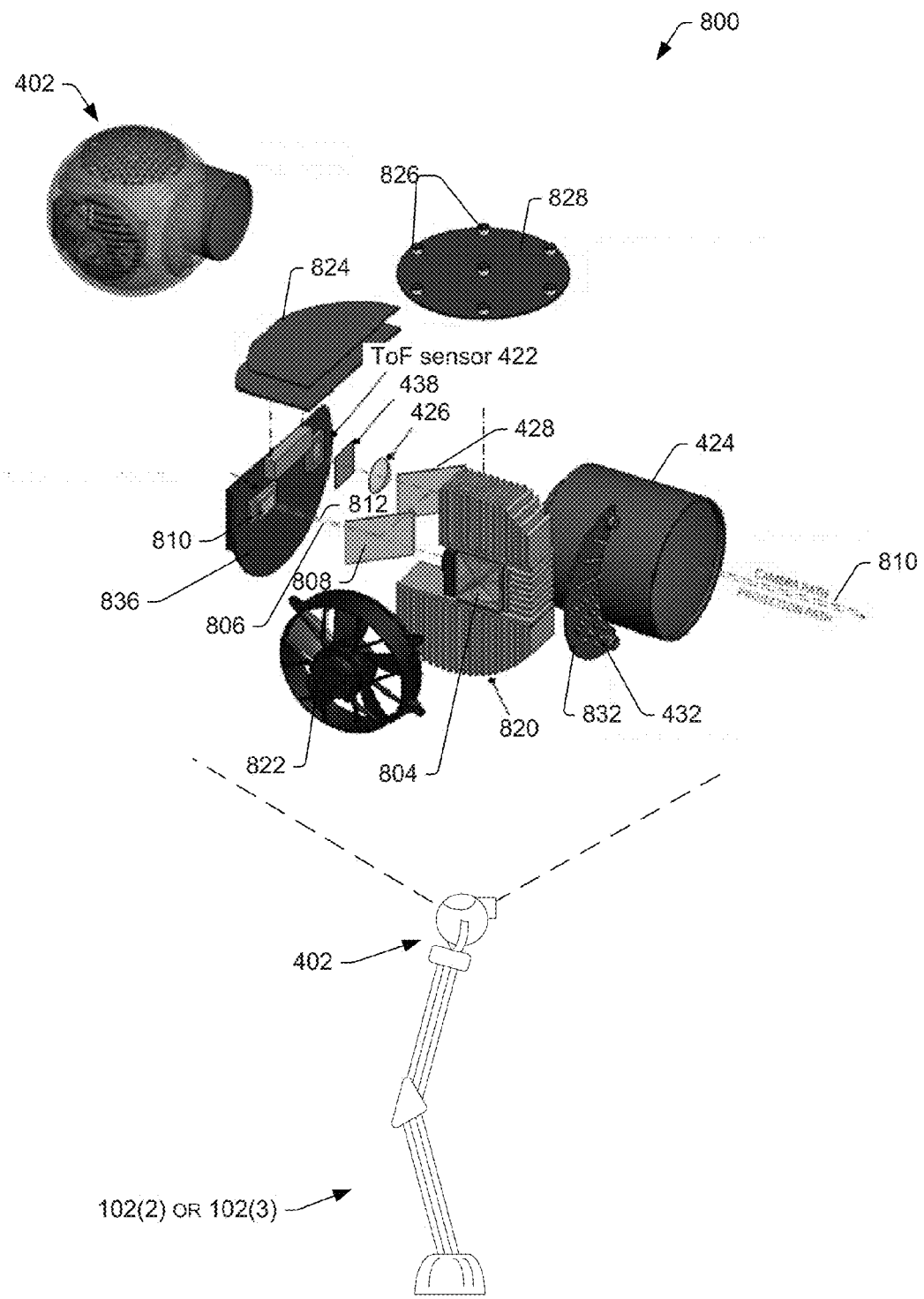
FIG. 8B shows an exploded view of the head structure of the implementation illustrated in FIG. 8A. In the implementations of FIGS. 8A and 8B, a rotation arrangement is configured to rotate a micro-mirror device of a projector of the projection and image capturing system, to correspondingly rotate an image projected by the projector.

FIG. 8A shows another implementation of the ARFN 102 (2) or 102(3), implemented as part of a structure that appears as a table lamp, although it may be incorporated into other familiar types of furniture. FIG. 8B shows an exploded view of the lamp head structure of the implementation illustrated in FIG. 8A.

The implementation of FIG. 8A is similar to that of FIG. 4. However, FIG. 8A illustrates another example implementation of the projector 420 in more detail; namely a projector that employs a micro-mirror device with a rotation arrangement enable rotation of projected images on a surface. Some of the components illustrated in FIG. 8A (e.g., the lens 424, the array of IR LEDs 432, the beam splitter 428, the lens 426, the IR filter 438, and the ToF sensor 422) may operate in a manner which is similar to the operations of the corresponding components of FIG. 4.

Referring to FIGS. 8A and 8B, the projector 420 includes a light source 804. The light source 804 may generate visible light components (e.g., Red, Blue, Green components). The light source 804 may be an LED, laser, filament-based lamp, and so forth. As illustrated in FIG. 8B, a heat sink 820 and/or a cooling fan 822 may be formed around the light source 804 to help dissipate heat.

The light source 804 outputs a light beam 806 (illustrated as dotted line in FIGS. 8A and 8B) that passes through an angled beam splitter 808 of the projector 420. The beam splitter 808 may be, for example, similar to the beam splitters 428 and/or 508 of FIGS. 4 and 5.

The light beam 806, after passing through the beam splitter 808, may be projected onto a micro-mirror device 810 of the projector 420. The micro-mirror device 810 may be, for example, a digital micro-mirror device (DMD). The micro-mirror device 810 may comprise an array of pixel-sized micro-mirrors. In an implementation discussed in more detail below, the micro-mirror device 810 may be rotated (e.g., about the light beam 806) to correspondingly rotate an image projected by the projector 420 onto a scene.

In one implementation, the micro-mirror device 810 may be mounted or otherwise arranged on a digital light processing (DLP) chip of the projector 420, and the DLP chip may be mounted on a printed circuit board (PCB) 836. In another implementation, the micro-mirror device 810 may be directly mounted on the PCB 836. The ToF sensor 422 may also be mounted on the PCB 836, as illustrated in FIG. 8B, although in another implementation, the ToF sensor 422 may be mounted on a different PCB. Another PCB 824 (illustrated in FIG. 8B) may carry the electronics for the micro-mirror device 810 and/or the ToF sensor 422.

Each micro-mirror of the array of micro-mirrors of the micro-mirror device 810 may be individually actuated and oriented in either a first position or a second position, such that the micro-mirror operates in either in a first state or a second state. While a micro-mirror is in the first position (i.e., operates in the first state), light from the light source 804 is reflected by the micro-mirror towards the beam splitter 808. On the other hand, while the micro-mirror is in the second position (i.e., operates in the second state), light from the light source 804 is reflected by the micro-mirror towards a light dump area, e.g., the light reflected by the micro-mirror does not reach the beam splitter 808. The light dump area may comprise any appropriate area in the projector 420, from which light does not reach or is not reflected towards the beam splitter 808. Thus, light reflected by the micro-mirrors, which are in the second state, bypasses the beam splitter 808 and may be absorbed internally of the lamp head 402.

Individual micro-mirrors of the of the micro-mirror device 810 may be oriented based on an image that is to be projected by the projector 420 onto a scene. For example, based on a value of a pixel in the image that is to be projected by a corresponding micro-mirror, the micro-mirror operates in one of the two states (i.e., reflects light either towards the beam splitter 808, or towards the light dump area). If the image to be projected changes with time, the states of the micro-mirrors may also change accordingly (e.g., by appropriately rotating and re-positioning the micro-mirrors).

Light from one or more of the micro-mirrors of the micro-mirror device 810 (e.g., from those micro-mirrors that are in the first state) may be reflected towards the beam splitter 808 (illustrated as light 812 in FIGS. 8A and 8B). Light 812 from the micro-mirror device 810 may be reflected by the beam splitter 808 towards the beam splitter 428. The light reflected by the beam splitter 808 towards the beam splitter 428 may eventually be projected as an image onto a scene, as discussed in more detail with respect to FIG. 4.

In an implementation and as illustrated in FIG. 8A, a graphics processing unit (GPU) 834 may be coupled to the micro-mirror device 810, where the GPU 834 may be configured to control rotation or positioning of individual micro-mirrors of the micro-mirror device 810, based on the image that is to be projected. The GPU 834 may receive the image (or instructions for positioning the micro-mirrors of the micro-mirror device 810) from any appropriate source, e.g., the computer 440.

In an implementation, the micro-mirror device 810 is coupled to a rotation arrangement 816 (illustrated in FIG. 8A). The rotation arrangement 816 may be configured to rotate the micro-mirror device 810, such that the rotation of the micro-mirror device 810 is about the light beam 806. For example, an axis, which passes through a center of the light beam 806 and is parallel to the light beam, may be normal to the rotation of the micro-mirror device 810. Also, the axis may pass through the center of the micro-mirror device 810. In other words, the micro-mirror device 810 may be rotated such that the light beam 806 is normal to the micro-mirror device 810 and is co-axial with the micro-mirror device 810.

It is to be noted that the rotation of the micro-mirror device 810, using the rotation arrangement 816, is different from the rotation of individual micro-mirrors of the micro-mirror device 810. For example, as previously discussed herein, individual micro-mirrors of the micro-mirror device 810 are rotated such that individual micro-mirrors are either in a first state or a second state (and such rotation of individual micro-mirrors need not be normal to the light beam 806), based on values of individual pixels of the image. On the other hand, the rotation arrangement 816 rotates the entire micro-mirror device 810, including all the micro-mirrors of the micro-mirror device 810, normal to the light beam 806, and such a rotation is based on a desired orientation of the projected image (e.g., whether it is desired to project the image in, for example, a portrait orientation or a landscape orientation).

In some implementations, the micro-mirror device 810 may be mounted on a DLP chip, which may be mounted on the PCB 836—in these implementations, the entire DLP chip, including the micro-mirror device 810, may be rotated. In some other implementations, the micro-mirror device 810 may be mounted directly on the PCB 836—in these implementations, only the micro-mirror device 810 may be rotated.

FIGS. 8C-8F show rotation of the micro-mirror device 810. Each of FIGS. 8C-8F illustrates a front view of the PCB 836, with the micro-mirror device 810 mounted thereon. Each of FIGS. 8C-8F illustrates two axis: a first axis that passes through a length of the micro-mirror device 810, and a second axis that is horizontal relative to the PCB 836. An orientation of the first axis changes as the micro-mirror device 810 is rotated, while an orientation of the second axis does not change with the rotation of the micro-mirror device 810. Each of FIGS. 8C-8F also illustrates an angle α that is formed between the two axes.

Figure 8C:
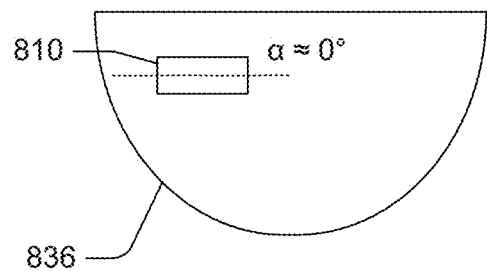
FIGS. 8C-8F show rotation of the micro-mirror device of FIGS. 8A and 8B.

As illustrated in FIG. 8C, during a first position of the micro-mirror device 810, the first and second axes coincides (i.e., α=0), and the micro-mirror device 810 is in a horizontal position.

Figure 8D:
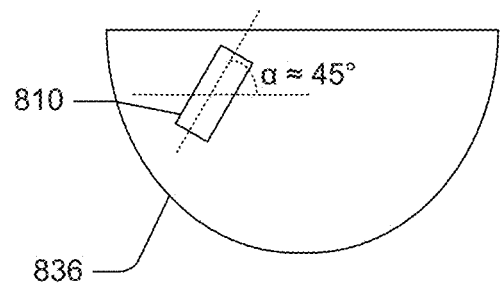

The micro-mirror device 810 may be rotated counter clockwise by 45° to be in a second position, as illustrated in FIG. 8D. While the micro-mirror device 810 is in the second position, the first and second axes are at 45° angle, i.e., α=45°.

Figure 8E:
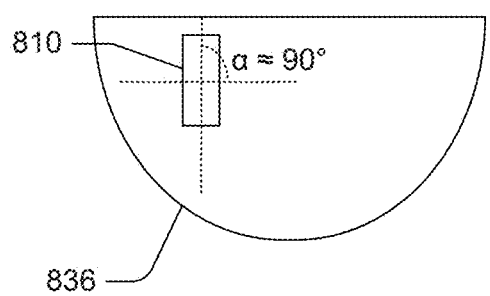

The micro-mirror device 810 may be further rotated counter clockwise by 45° to be in a third position, as illustrated in FIG. 8E. While the micro-mirror device 810 is in the third position, the first and second axes are perpendicular, i.e., α=90°.

Figure 8F:
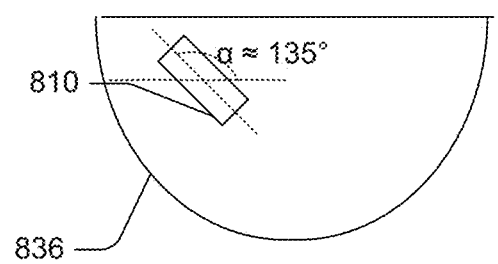

The micro-mirror device 810 may be further rotated counter clockwise by 45° to be in a fourth position, as illustrated in FIG. 8F. While the micro-mirror device 810 is in the fourth position, the first and second axes are at 135° angle, i.e., α=135°.

FIGS. 8C-8F show four example positions of the micro-mirror device 810. The micro-mirror device 810 can be rotated to any other appropriate positions, such that the angle α takes any value throughout a 360° circle such as from −180 to +180°. Furthermore, although FIGS. 8C-8F illustrate a counter clockwise rotation of the micro-mirror device 810, the micro-mirror device 810 may be rotated clockwise as well.

Rotating the micro-mirror device 810 results in a rotation of the image that is projected by the projector 420. As an example, the micro-mirror device 810 may have micro-mirrors to project an image comprising a maximum of 480×640 pixels, when the micro-mirror device 810 is in the first position (i.e., the position corresponding to FIG. 8C). The projected image may, when the micro-mirror device 810 is in the first position, correspond to a landscape orientation. When the micro-mirror device 810 is rotated in the third position (i.e., the position corresponding to FIG. 8C, by rotating the micro-mirror device 810 by 90°), the projected image will also be rotated by 90°, such that the projected image will now have 640×480 pixels. The projected image may, when the micro-mirror device 810 is in the third position, correspond to a portrait orientation. The micro-mirror device 810 may be rotated by any other appropriate angle, to correspondingly rotate the projected image by that angle. The size of the image (480×640 pixels) is merely an example, and the image may have any other appropriate number of pixels.

In an implementation, instead of rotating the micro-mirror device 810, the projected image may be rotated by software (e.g., by appropriately re-positioning individual micro-mirrors of the micro-mirror device 810 to operate either in the first state or the second state). For example, the micro-mirror device 810 may be fixed at the first position (i.e., the position corresponding to FIG. 8C), and the projected image may have 480×640 pixels (i.e., correspond to the landscape orientation). It may be desired to rotate the projected image by 90°, e.g., such that the projected image is at the portrait orientation. This may be achieved by changing the states of the individual micro-mirrors of the micro-mirror device 810. However, as a maximum height of the image that can be projected by the micro-mirror device 810 while in the first position is 480 pixels, the image in the portrait orientation may not be fully projected by the micro-mirror device 810. For example, a top and bottom portion of the image may be cut off (i.e., not projected by the micro-mirror device 810 due to the limited height of the micro-mirror device 810). In contrast, rotating the micro-mirror device 810, as discussed with respect to FIGS. 8A-8F, preserves the full pixel count of the image while the image is rotated.

In an implementation, instead of rotating the micro-mirror device 810, the projected image may be rotated by rotating the head 402. However, as the head 402 is relatively large compared to the micro-mirror device 810, it may be easier, faster and less time consuming to rotate the micro-mirror device 810 compared to rotating the head 402. For example, a motor used to rotate only the micro-mirror device 810 may be relatively small compared to that used for rotating the head 402.

In an implementation, a controller 830 may be coupled to the rotation arrangement 816, to control the rotation arrangement 816 to rotate the micro-mirror device 810, as illustrated in FIG. 8A. The controller 830 may rotate the micro-mirror device 810 (e.g., via the rotation arrangement 816) and correspondingly rotate the projected image, based on an input received from an appropriate source. For example and although not illustrated in the figures, a user may view a projected image and may desire to change an orientation of the projected image by 90° (e.g., instead of viewing a landscape orientation of the image, may desire to view a portrait orientation of the image). The user may use an appropriate interface (e.g., use an interface of the computer 440 and/or use a hand gesture that is captured by the ToF sensor 422) to instruct the image to be rotated. The controller 830 may act on such an instruction and rotate the micro-mirror device 810 (e.g., via the rotation arrangement 816) and correspondingly rotate the projected image. In an implementation, the controller 830 may receive an indication of an angle by which the projected image is to be rotated. Based on the indication of the angle, the controller 830 may instruct the rotation arrangement 816 to rotate the micro-mirror device 810.

Although not illustrated in the figures, the rotation arrangement 816 may be mounted on a back side of the PCB 836, e.g., on a side of the PCB 836 that is opposite to a side on which the micro-mirror device 810 is mounted (not illustrated in FIG. 8b). The rotation arrangement 816 may comprise, for example, a motor to rotate the micro-mirror device 810. If the micro-mirror device 810 is mounted on a DLP chip, the DLP chip may be coupled to the motor through a shaft (that goes through a hole in the PCB 836), a socket and ball bearings, and/or through a pivot-socket arrangement. In an example, a post may couple the motor to the DLP chip, where the post rotates co-axially with the motor. In another example, a structural ring may be positioned around the DLP chip and/or the micro-mirror device 810, and the structural ring may provide the rotational motion.

The micro-mirror device 810 may be coupled to other components of the projector (e.g., the GPU 834, a power supply, and so on) through, for example, a flexible cable, a ribbon cable or the like. Such a coupling may ensure free rotation of the micro-mirror device 810.

In an implementation and although not illustrated in FIG. 8B, the ToF sensor 422 may not be mounted on the PCB 836 (e.g., the ToF sensor 422 may be mounted on a PCB that is different from the PCB 836). In such an implementation, instead of only rotating the micro-mirror device 810, the entire PCB 836 may be rotated, which also results in a rotation of the micro-mirror device 810. In such an implementation, the PCB 836 may be rotated such that a center of rotation of the PCB 836 substantially coincides with a center of the micro-mirror device 810. This may ensure, for example, that the light beam 806 is always normally projected on a center of the micro-mirror device 810, irrespective of the rotation of the PCB 836.

As illustrated in FIG. 8B, a front PCB 832 carries an array of IR LEDs 432 for illuminating the scene. The IR LEDs 432 emit IR beams that go into the environment, bounce off objects, and return to the lens 424. The returning IR signals are passed through the beam splitter 428, through the lens 426 and IR filter 438, and onto the ToF sensor 422. The front PCB 832 may further mount one or more RGB cameras, e.g., two cameras: one with a wide field of view and one with a narrow field of view. An array of microphones 826 is mounted on a top PCB 828 to capture sound from the environment. This particular array has 7 microphones, with one microphone at the center of a circle of six microphones, although a different number and orientation of the microphones may also be used.

To fully capture user interaction with the entire image projected by the projector 420 (e.g., to sense that a user touches any portion of the projected image), the IR beams emitted by the IR LEDs 432 need to illuminate at least the entire projected image, and the ToF sensor 422 needs to be large enough to sense IR beams reflected from an entire section of the scene onto which the image is projected by the projector 420.

With the rotation of the micro-mirror device 810, the image projected by the projector 420 also rotates. Accordingly, a section of the scene covered by the projected image also changes with the rotation of the micro-mirror device 810. For example, a first section of the scene may be covered by the projected image while the micro-mirror device 810 is in the first position (e.g., corresponding to FIG. 8C), and a second section of the scene may be covered by the projected image while the micro-mirror device 810 is in the second position (e.g., corresponding to FIG. 8D), where the first section may be different from the second section (although may partially overlap). In an implementation, the IR LEDs 432 projects the IR beams such that the projected IR beam covers all sections of the scene on which the image is projected, while the image is rotated. Similarly, the ToF sensor 422 may be large enough to sense IR beams reflected from all the sections of the scene onto which the image is projected by the projector 420, while the image is rotated. For example, the IR LEDs 432 projects the IR beams such that the projected IR beam covers both the above discussed first section and the second section of the scene (or any other sections onto which the image may be projected while being rotated). Similarly, the ToF sensor 422 may be large enough to sense IR beams reflected from both the first section and the second section of the scene (or any other sections onto which the image may be projected while being rotated). Thus, for example, the ToF sensor 422 may be large enough to sense IR beams reflected from the section of the scene onto which the image is projected in the portrait orientation and also from the section of the scene onto which the image is projected in the landscape orientation (or in an orientation that is in between the portrait orientation and the landscape orientation).

In an implementation, the ToF sensor 422 may not be large enough to cover both the portrait and landscape orientations of the projected image. For example, the ToF sensor 422 may be rectangular in shape and may be sized to cover the portrait orientation of the projected image. However, when the image is rotated to the landscape orientation, the ToF sensor 422 may cover only a part of the image (e.g., may not cover a left portion and a right portion of the image projected in the landscape orientation). In an implementation, the ToF sensor 422 may be rotated synchronously with the rotation of the micro-mirror device 810. For example, if the micro-mirror device 810 is rotated by 90°, the ToF sensor 422 may also be rotated correspondingly by 90°. Thus, if the image is projected in the portrait orientation, the ToF sensor 422 may also be in the portrait orientation; and if the image is projected in the landscape orientation, the ToF sensor 422 may also be rotated to the landscape orientation. Rotating the ToF sensor 422 synchronously with the micro-mirror device 810 may ensure, for example, that the image projected by the micro-mirror device 810 is always covered by the ToF sensor 422.

Synchronized rotation of the ToF sensor 422 and the micro-mirror device 810 may be achieved by any appropriate manner. For example, a single motor, along with appropriate gear and/or shaft assemblies, may synchronously rotate the ToF sensor 422 and the micro-mirror device 810. In another example, two separate motors, whose motions are synchronized by an appropriate manner (e.g., using appropriate electrical and/or mechanical arrangements), may respectively drive the ToF sensor 422 and the micro-mirror device 810.

It is noted that the illustrated arrangements of the projector 420 in FIGS. 8A and 8B are merely representative. Other arrangements of the projector 420 may also be envisioned, in which a micro-mirror device is rotated to correspondingly rotate a projected image. Further, the illustrated shapes and angles of various components and light beams illustrated in FIGS. 8A and 8B are provided to show example implementations, but in no way are intended to be limiting.

Other Exemplary Arrangements of the Lamp

Figure 9:
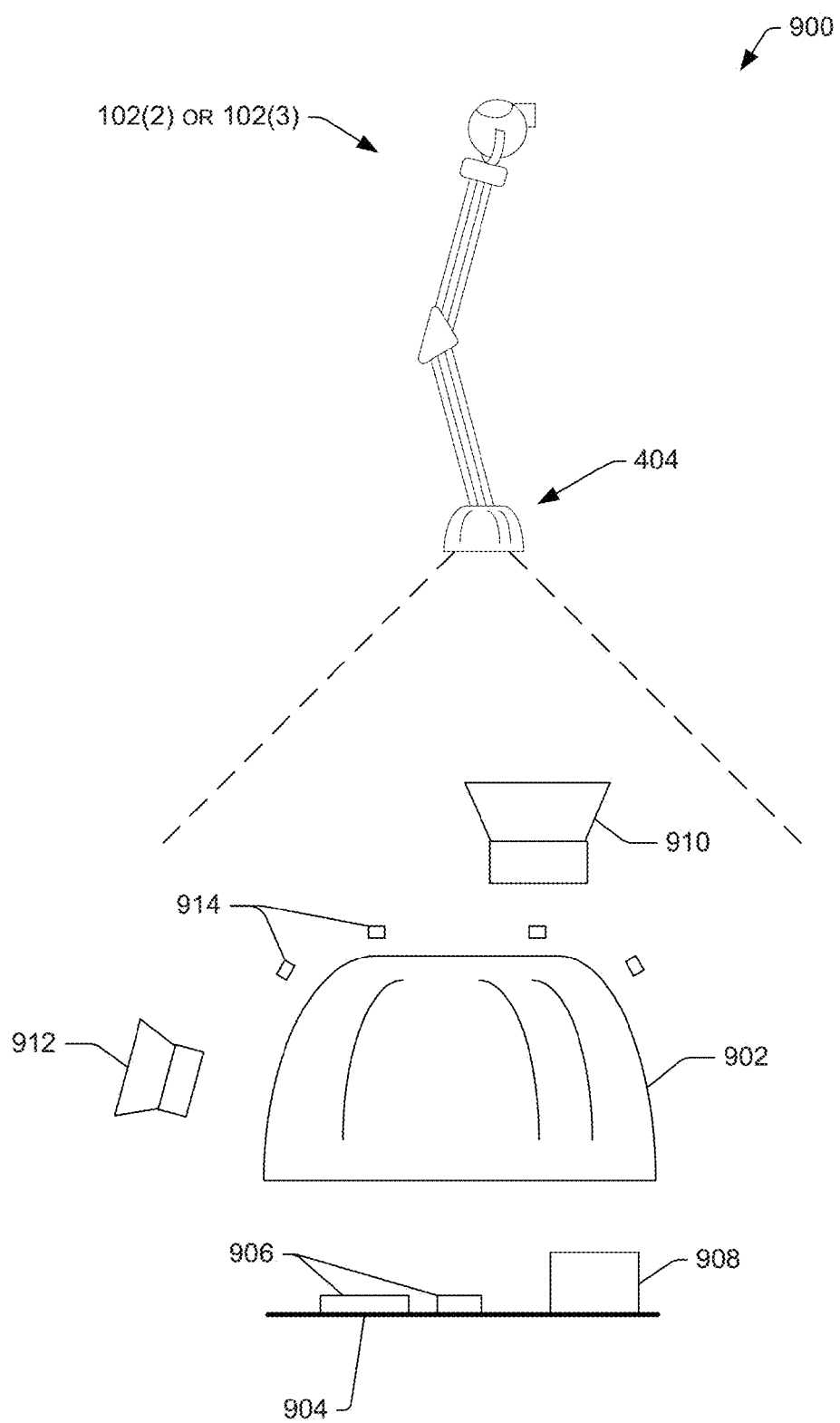
FIG. 9 shows an exploded view of components in a base of the lamp according to one implementation.

FIG. 9 shows an exploded view 900 of components in the base 404 of the lamp-embodied ARFN 102(2) or 102(3) according to one implementation. The base 404 includes a housing 902 formed of a material suitable to encase the active components and to provide sufficient weight to hold the lamp on a surface while the head and arm mechanism are moved and fully extended in various directions. A PCB 904 is mounted in the bottom of the housing 902 and defines the main logic board of the ARFN 102. The PCB 904 holds various computing components 906 of computer 440, such as processor(s), memory, and I/O interfaces. A power supply 908 is also provided on the PCB 904.

One or more speakers may be arranged within the housing 902. Two speakers 910 and 912 are illustrated in FIG. 9. The first speaker 910 is a low frequency speaker, while the second speaker 912 has a mid to high frequency range. One or more microphones 914 may also be arranged in the base housing 902.

Figure 10:
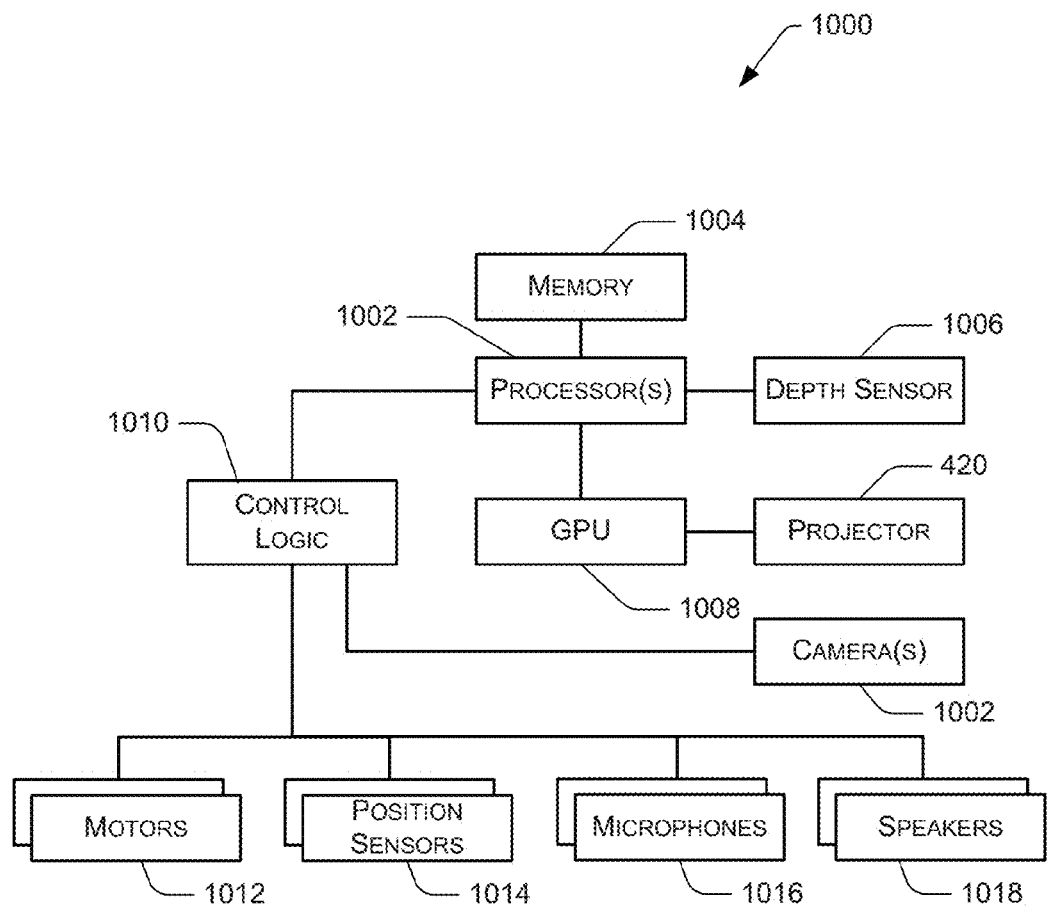
FIG. 10 is a block diagram of functional components that may be used in the implementations of FIGS. 4 and 5.

FIG. 10 shows functional components 1000 that may be implemented as part of the lamp-embodied ARFN 102(2) or 102(3) of FIGS. 4 and 5, respectively. The functional components 1000 include one or more processors 1002 coupled to memory 1004. A depth sensor 1006 may be coupled to the processor 1002, formed as part of the processor 1002, or implemented as firmware/software stored in the memory 1004 and executed on the processor 1002. A separate graphics processing unit (GPU) 1008 may be coupled to the processor 1002 to generate the images to be projected by the projector 420. The projector may include a micro-mirror device comprising a plurality of micro-mirrors. The micro-mirror device may be rotated to correspondingly rotate an image projected by the projector.

Control logic 1010, such as a field programmable gate array (FPGA), is shown coupled to the processor 1002 to control various electrical and mechanical components. For instance, the control logic 1010 may be coupled to control various motors 1012, such as the tilt motor 708 and the pan motor 714 of the universal connector 416 in FIG. 7. The control logic 1010 may also be coupled to control position sensors 1014, microphones 1016 (e.g., microphones 826 in FIG. 8), and speakers 1018 (e.g., speakers 910 and 912 in FIG. 9).

Illustrative Process

Figure 11:
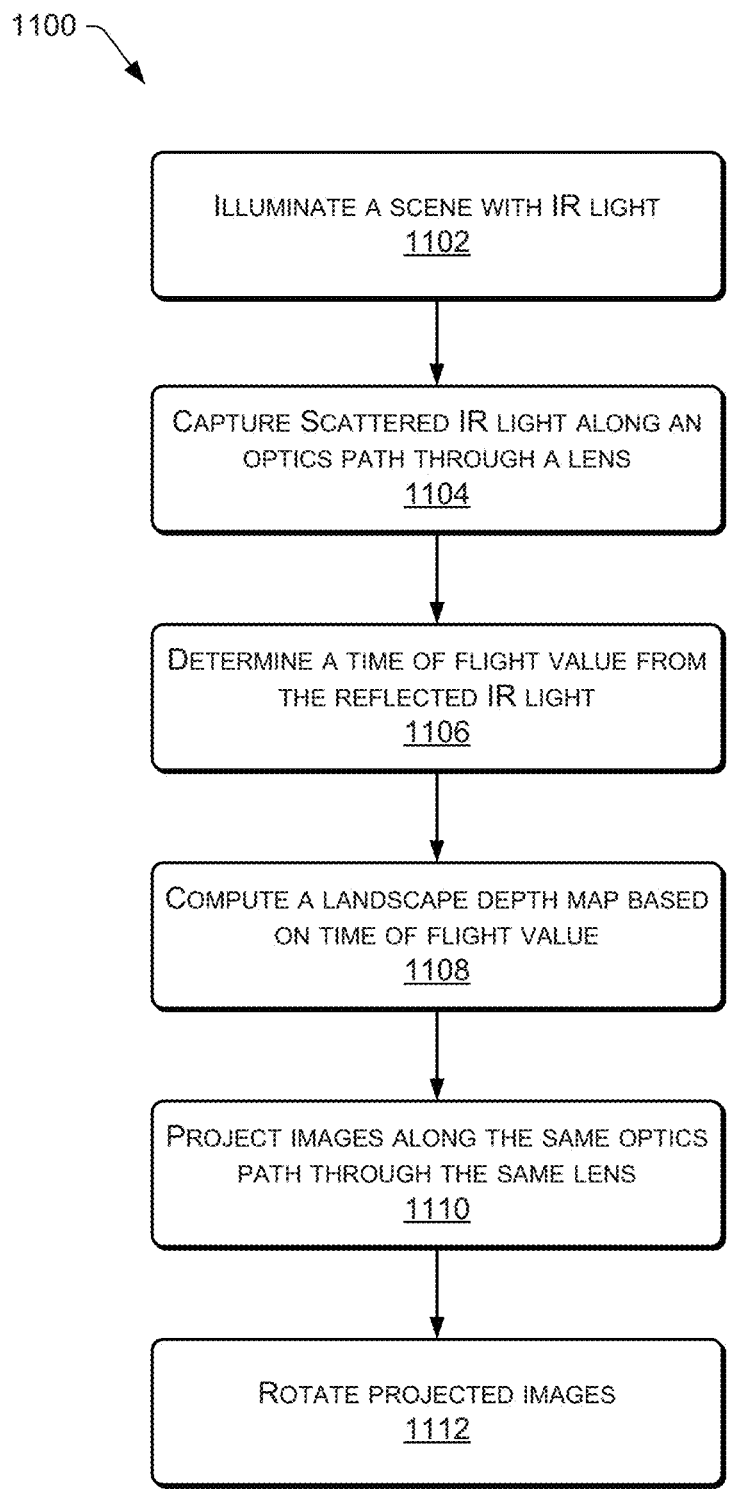
FIG. 11 shows an illustrative process of providing an enhanced augmented reality environment using a projection and camera system that shares a common optical path.

FIG. 11 shows an illustrative process 1100 of providing an enhanced augmented reality environment using a projection and camera system that shares a common optical path. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1102, a scene is illuminated with IR light. In one implementation, the IR light may be emitted from an array of LEDs or lasers positioned about a lens, as shown in the example of FIGS. 4 and 7. Alternatively, an IR beam from a laser may be passed through a lens of the ARFN, as shown in the example of FIG. 5.

At 1104, scattered IR light from objects in the scene is captured along an optical path through a lens. As shown in FIGS. 5 and 6, for example, the IR light is collected through the lens 424 along the optical path defined therein. The IR light is directed to a time-of-flight camera and/or sensor.

At 1106, a time of flight is determined from the scattered IR light. This computation may be made by a depth module 446 (or hardware) in the computer 440 based on a time-of-flight of the IR light from emission to capture by the ToF sensor 422.

At 1108, a landscape depth map is computed based on the time of flight computations. This depth map helps the system understand the dimensions and layout of the room for purposes of creating an augmented reality environment.

At 1110, images are projected along the same optical path and through the same lens as used to collect the IR light for ToF calculations. In the implements of FIGS. 4, 5 8A and 8B, the projector 420 outputs the light carrying the images, and that light is passed through the lens 424 along the same optical path as the IR light.

At 1112, the projected images are rotated, based on, for example, an input received from a user. Such a rotation of the images is achieved by, for example, rotating the micro-mirror device 810 of FIGS. 8A and 8B.

In this manner, the methodology enabled by the projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor. The methodology enabled by the projection and camera system further allows rotation of images projected by the projection and camera system.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
   an illumination component to illuminate at least a portion of an environment;
   a projector to project images onto a surface of the environment, the projector comprising:
      a light source;
      a micro-mirror device that includes a plurality of micro-mirrors, wherein light from the light source is reflected, at least in part, by one or more of the plurality of micro-mirrors to project an image onto the surface, and
      a motor coupled to the micro-mirror device, the motor configured to rotate the micro-mirror device such that the image projected onto the surface is correspondingly rotated; and
   a time-of-flight sensor to receive at least a portion of light from the illumination component scattered by the environment, the time-of-flight sensor configured to determine a time of flight value associated with one or more objects in the illuminated portion of the environment, wherein the motor is further configured to rotate the time-of-flight sensor.

2. The device of claim 1, wherein the motor is configured to rotate the micro-mirror device about an axis that is at least coaxial with a path of the light from the light source to the micro-mirror device.

3. The device of claim 1, wherein the motor is configured to rotate the micro-mirror device, such that the image is projected onto the surface in at least one of (i) a portrait orientation, (ii) a landscape orientation, or (iii) an orientation that is in between the portrait orientation and the landscape orientation.

4. The device of claim 1, wherein individual micro-mirrors of the plurality of micro-mirrors are oriented to selectively reflect at least a portion of the light from the light source towards one of (i) an optical path for projection and (ii) a light dump area.

5. The device of claim 4, wherein individual micro-mirrors of the plurality of micro-mirrors are oriented based on the image that is to be projected onto the surface.

6. The device of claim 1, wherein the motor is further configured to rotate the micro-mirror device and the time-of-flight sensor in a synchronized manner.

7. The device of claim 1, wherein:
the projector projects the image onto the surface such that the image covers a first area of the surface when the micro-mirror device is rotated to a first orientation;
the projector projects the image onto the surface such that the image covers a second area of the surface when the micro-mirror device is rotated to a second orientation; and
the illumination component illuminates at least a third area of the surface, wherein the third area encompasses the first area and the second area.

8. The device of claim 7, wherein the time-of-flight sensor is configured to receive a portion of light from the illumination component scattered by at least the third area of the surface.

9. The device of claim 1, further comprising a processor to determine distance information of the one or more objects relative to the time of flight sensor, the distance information determined based at least in part on the determined time of flight value.

10. A system in a structure comprising:
a light source;
a micro-mirror device comprising a plurality of micro-mirrors, wherein one or more of the plurality of micro-mirrors are configured to reflect at least a portion of light from the light source to project an image onto a surface in an environment;
a rotation arrangement configured to rotate the micro-mirror device such that the image projected onto the surface is correspondingly rotated; and
a time-of-flight sensor configured to determine values associated with distances to one or more objects in the environment, the time-of-flight sensor configured to receive light reflected from the one or more objects in the environment along an optical path in the structure shared in common with light reflected by the one or more of the plurality of micro-mirrors from the light source.

11. The system of claim 10, wherein the rotation arrangement is configured to rotate the micro-mirror device about an axis that is at least coaxial with a path of the light from the light source to the micro-mirror device.

12. The system of claim 10, wherein individual micro-mirrors of the plurality of micro-mirrors are oriented to selectively reflect at least a portion of the light from the light source (i) along an optical path, or (ii) towards a light dump area.

13. The system of claim 10, wherein individual micro-mirrors of the plurality of micro-mirrors are oriented based on the image that is to be projected onto the surface.

14. The system of claim 10, wherein the micro-mirror device is a digital micro-mirror device (DMD).

15. The system of claim 10, wherein the rotation arrangement comprises a motor coupled to the micro-mirror device.

16. The system of claim 10, further comprising control logic configured to:
receive an input specifying an angle by which the image is to be rotated; and
based on receiving the input, facilitate the rotation arrangement to rotate the micro-mirror device such that the image projected onto the surface is correspondingly rotated by the specified angle.

17. A system in a structure comprising:
a light source;
a device to generate an image for projection onto a surface in an environment;
a rotation arrangement configured to rotate the device such that the image projected onto the surface is correspondingly rotated; and
a time-of-flight sensor configured to determine values indicative of distances to one or more objects in the environment, the time-of-flight sensor configured to receive light reflected from the one or more objects in the environment along an optical path in the structure shared in common with light emitted from the light source.

18. The system of claim 17 wherein the device comprises a micro-mirror device configured to reflect at least a portion of light from the light source.

19. The system of claim 18 wherein the rotation arrangement is configured to rotate the micro-mirror device such that the image projected onto the surface is correspondingly rotated.

20. The system of claim 17 wherein the rotation arrangement is further configured to rotate the time-of-flight sensor.

21. The system of claim 17, wherein the rotation arrangement is further configured to rotate the device and the time-of-flight sensor in a synchronized manner.

* * * * *

UNITED STATES PATENT AND TRADEMARK OFFICE
CERTIFICATE OF CORRECTION

PATENT NO.         : 9,294,746 B1
APPLICATION NO.    : 13/544706
DATED              : March 22, 2016
INVENTOR(S)        : Colter Earl Cederlof et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this
Fourteenth Day of June, 2016

Michelle K. Lee
*Director of the United States Patent and Trademark Office*